US012687413B2

(12) United States Patent
Kuwahara

(10) Patent No.: US 12,687,413 B2
(45) Date of Patent: Jul. 21, 2026

(54) OPTICAL MODULE FOR ENCODER AND REFLECTION-TYPE ENCODER

(71) Applicant: HAMAMATSU PHOTONICS K.K., Hamamatsu (JP)

(72) Inventor: Yosuke Kuwahara, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 38 days.

(21) Appl. No.: 18/848,227

(22) PCT Filed: Feb. 6, 2023

(86) PCT No.: PCT/JP2023/003868
§ 371 (c)(1),
(2) Date: Sep. 18, 2024

(87) PCT Pub. No.: WO2023/181670
PCT Pub. Date: Sep. 28, 2023

(65) Prior Publication Data
US 2025/0198807 A1     Jun. 19, 2025

(30) Foreign Application Priority Data
Mar. 25, 2022    (JP) ................................. 2022-050215

(51) Int. Cl.
*G01D 5/347*          (2006.01)
(52) U.S. Cl.
CPC ........... *G01D 5/3473* (2013.01); *G01D 5/347* (2013.01); *G01D 5/34715* (2013.01)
(58) Field of Classification Search
CPC .. G01D 5/3473; G01D 5/34715; G01D 5/347; G01D 11/245; G01D 5/34723; H10F 39/804; H10F 55/255
See application file for complete search history.

(56) References Cited

U.S. PATENT DOCUMENTS

2002/0167062 A1* 11/2002 Narita ..................... H10F 77/50
257/E31.117
2017/0109561 A1* 4/2017 Wyrwas ............. G06V 40/1329

FOREIGN PATENT DOCUMENTS

JP          H7-249234 A       9/1995
JP          2003-014914 A       1/2003
(Continued)

OTHER PUBLICATIONS

International Preliminary Report on Patentability mailed Oct. 10, 2024 for PCT/JP2023/003868.

*Primary Examiner* — Georgia Y Epps
*Assistant Examiner* — Erin R Garber
(74) *Attorney, Agent, or Firm* — Faegre Drinker Biddle & Reath LLP

(57)          ABSTRACT

An optical module includes: a support having a bottom wall part and a side wall part; a light receiving element and a light emitting element; a light transmitting member disposed on the side wall part; and a resin member disposed on a surface of the light transmitting member. The surface of the light transmitting member has an inner region and an outer region. The resin member is integrally formed over the inner region and the outer region. A refractive index of the resin member with respect to light having a center wavelength of light emitted from the light emitting element is smaller than a refractive index of the light transmitting member with respect to the light having the center wavelength. The light transmitting member is bonded to the side wall part by a portion of the resin member formed on the outer region.

12 Claims, 5 Drawing Sheets

(56)           References Cited

FOREIGN PATENT DOCUMENTS

| | | | |
|---|---|---|---|
| JP | 2004-045284 | A | 2/2004 |
| JP | 2010-002324 | A | 1/2010 |
| JP | 2012194162 | A  * | 10/2012 |
| JP | 2012-254194 | A | 12/2012 |
| JP | 2013-036999 | A | 2/2013 |
| JP | 2013-070078 | A | 4/2013 |
| JP | 2019-158851 | A | 9/2019 |
| JP | 2022-027049 | A | 2/2022 |
| WO | WO-2020012776 | A1  * | 1/2020 ............ G01D 5/347 |
| WO | 2022/138519 | A1 | 6/2022 |

* cited by examiner (a)

(b)

OPTICAL MODULE FOR ENCODER AND REFLECTION-TYPE ENCODER

TECHNICAL FIELD

One aspect of the present disclosure relates to an optical module for an encoder applied to a reflection-type encoder and a reflection-type encoder.

BACKGROUND ART

Patent Literature 1 describes a reflection-type encoder. This reflection-type encoder includes a base part in which a light receiving element and a light emitting element are disposed, a wall part disposed on the base part so as to surround the light receiving element and the light emitting element, and a mask plate bonded onto the wall part. In this reflection-type encoder, light emitted from the light emitting element and reflected by a rotary plate passes through a slit formed in the mask plate and incident on the light receiving element.

CITATION LIST

Patent Literature

Patent Literature 1: Japanese Unexamined Patent Publication No. 2019-158851

SUMMARY OF INVENTION

Technical Problem

The reflection-type encoder as described above requires simplification of the configuration and improvement of detection accuracy. Therefore, an object of one aspect of the present disclosure is to provide an optical module for an encoder and a reflection-type encoder that can simplify the configuration and improve detection accuracy.

Solution to Problem

An optical module for an encoder according to one aspect of the present disclosure is an optical module to be applied to a reflection-type encoder, the optical module including: a support including a bottom wall part and a side wall part surrounding a region on the bottom wall part when viewed from a thickness direction of the bottom wall part; a light receiving element and a light emitting element disposed on the bottom wall part so as to be surrounded by the side wall part; a light transmitting member disposed on an end surface of the side wall part on a side opposite to the bottom wall part so as to cover a space surrounded by the side wall part and including a surface facing the bottom wall part; and a resin member formed on the surface of the light transmitting member, in which the surface of the light transmitting member includes an inner region facing the light emitting element and an outer region surrounding the inner region and facing the end surface, the resin member is integrally formed over the inner region and the outer region so as to include a portion facing the light emitting element, a refractive index of the resin member with respect to light having a center wavelength of light emitted from the light emitting element is smaller than a refractive index of the light transmitting member with respect to the light having the center wavelength, and the light transmitting member is bonded to the side wall part by a portion of the resin member formed on the outer region.

In this optical module for an encoder, the resin member is formed on the surface of the light transmitting member facing the bottom wall part, and the resin member is integrally formed over the inner region and the outer region on the surface of the light transmitting member so as to include a portion facing the light emitting element. Further, a refractive index of the resin member with respect to light having a center wavelength of light emitted from the light emitting element is smaller than a refractive index of the light transmitting member with respect to the light having the center wavelength. Thereby, the resin member can function as an anti-reflective layer, and light from the light emitting element can be suppressed from being reflected by the light transmitting member. As a result, light reflected by the surface of the light transmitting member can be suppressed from being incident on the light receiving element as noise light, and the detection accuracy can be improved. Furthermore, the light transmitting member is bonded to the side wall part by a portion of the resin member formed on the outer region. Thereby, it is not necessary to provide a member for bonding between the light transmitting member and the side wall part separately from the resin member functioning as an anti-reflective layer, and the configuration can be simplified. Further, in the case of applying this optical module for an encoder to a reflection-type encoder, for example, as compared with a case where the light transmitting member is disposed on the side wall part with the anti-reflective layer and the member for bonding interposed therebetween, a distance from the light receiving element and the light emitting element to the rotary plate can be shortened. When the distance from the light receiving element and the light emitting element to the rotary plate is short, spreading of light among the light receiving element, the light emitting element, and the rotary plate can be suppressed. As a result, the amount of light received by the light receiving element can be increased, and the detection accuracy can be improved. Furthermore, in a case where the member for bonding is a resin adhesive having no light transparency, the resin adhesive protrudes to the inside of the side wall part, and the surface of the light transmitting member is blocked by the protruding resin adhesive, so that the light transmission area may be reduced. On the other hand, since it is not necessary to provide a member for bonding in this optical module, such a reduction in light transmission area can be suppressed, and the detection accuracy can be improved. Therefore, according to this optical module for an encoder, the configuration can be simplified, and the detection accuracy can be improved.

The resin member may be formed over the entire inner region. In this case, the light emitted from the light emitting element and spread can be more reliably suppressed from being reflected on the surface of the light transmitting member, and the detection accuracy can be further improved.

A reflectance at an interface between the light transmitting member and the resin member when the light having the center wavelength of light emitted from the light emitting element is incident on the interface from the resin member side at an incident angle of 45 degrees may be smaller than a reflectance at the interface when the light having the center wavelength is incident on the interface from the light transmitting member side at an incident angle of 45 degrees. In this case, light emitted from the light emitting element and incident on the interface between the light transmitting member and the resin member at an angle other than perpendicular can be more reliably suppressed from being reflected at the interface. As a result, the detection accuracy can be further improved.

A light transmittance of the resin member with respect to light having a wavelength of 800 nm or more and 900 nm or less may be 90% or more. In this case, when the light emitting element that emits the light having this wavelength is used, the resin member can be favorably transmitted through the light emitted from the light emitting element. As a result, the detection accuracy can be further improved.

The resin member may be an adhesive film. In this case, since the heated resin member is cured in a relatively short time, the light transmitting member can be accurately bonded to the end surface of the side wall part by the resin member.

The resin member may be a die attach film. In this case, since the heated resin member is cured in a relatively short time, the light transmitting member can be accurately bonded to the end surface of the side wall part by the resin member.

The light emitting element may be disposed on the light receiving element. In this case, in a case where the optical module for an encoder is applied to a reflection-type encoder, a distance between the light emitting element and the rotary plate can be shortened, and the detection accuracy can be further improved.

The optical module for an encoder may further include a fiber optical plate including an input surface constituted by surfaces of one end of a plurality of optical fibers and an output surface constituted by surfaces of the other end of the plurality of optical fibers, the light receiving element may include a light receiving surface facing a side opposite to the bottom wall part, and the fiber optical plate may be disposed on the light receiving element with the output surface facing the light receiving surface. In this case, the light incident on the input surface can be reliably guided to the light receiving surface, and the detection accuracy can be further improved.

The optical module for an encoder may further include an adhesive film disposed between the light receiving surface and the output surface and configured to bond the fiber optical plate to the light receiving element. In this case, since the heated adhesive film is cured in a relatively short time, the fiber optical plate can be accurately bonded to the light receiving element by the adhesive film.

An anti-reflective layer may be formed on the surface of the light transmitting member on a side opposite to the bottom wall part. In this case, reflection of light on the surface of the light transmitting member on a side opposite to the bottom wall part can be suppressed, and the amount of light received by the light receiving element can be increased. As a result, the detection accuracy can be further improved.

The optical module for an encoder may further include a wire connected to the bottom wall part and the light receiving element; and a resin member covering the wire. In this case, the wire can be protected from oil scattered when the reflection-type encoder is used, physical external force, and the like.

A reflection-type encoder according to one aspect of the present disclosure includes a rotary plate including a light reflection pattern and the above-described optical module for an encoder. According to this reflection-type encoder, from the above-described reason, the configuration can be simplified, and the detection accuracy can be improved.

Advantageous Effects of Invention

According to one aspect of the present disclosure, it is possible to provide an optical module for an encoder and a reflection-type encoder that can simplify the configuration and improve detection accuracy.

DESCRIPTION OF EMBODIMENTS

Figure 1:
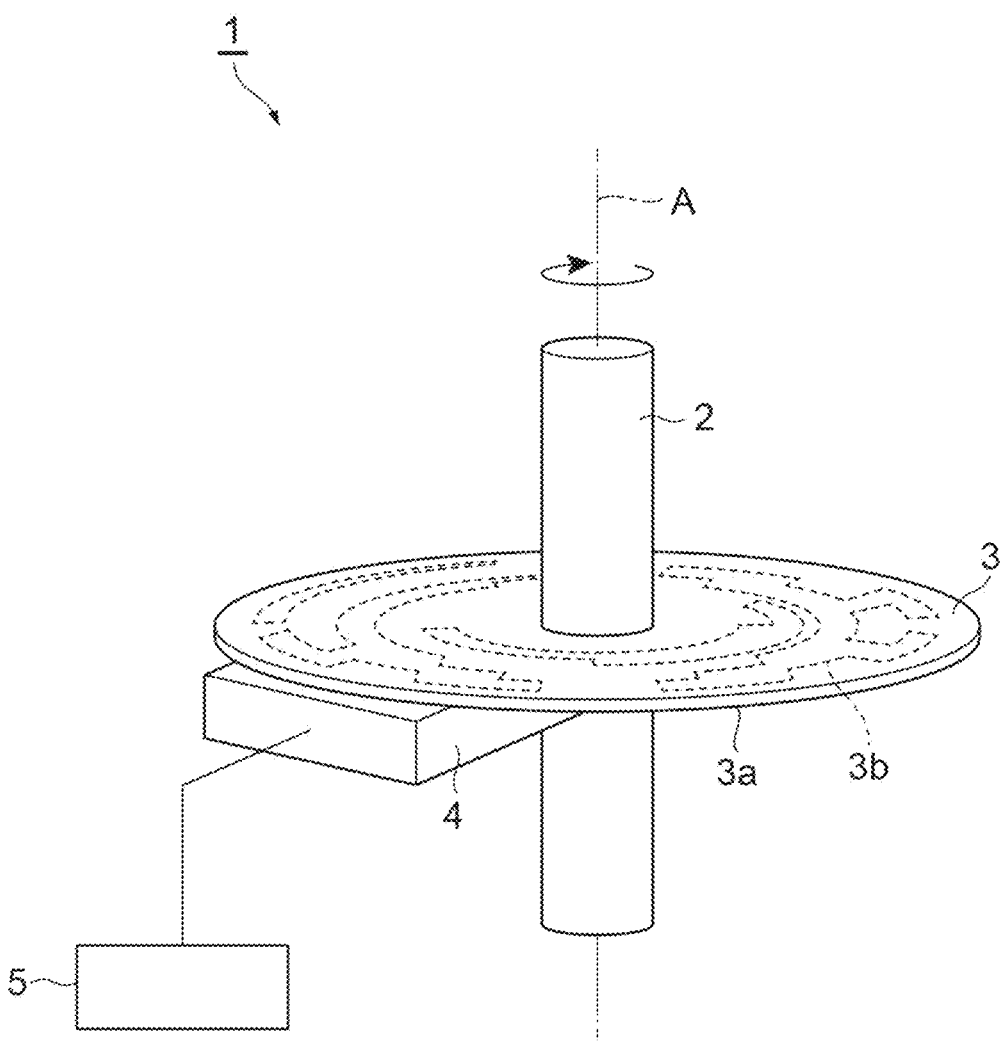
FIG. 1 is a perspective view of a reflection-type encoder according to an embodiment.

Hereinafter, an embodiment of the present disclosure will be described in detail with reference to the drawings. The following description will use the same reference numerals for the same or equivalent elements, and repeated descriptions will be omitted.

[Configuration of Reflection-Type Encoder]

As illustrated in FIG. 1, a reflection-type encoder 1 includes a rotating shaft 2, a rotary plate 3, an optical module (optical module for an encoder) 4, and a processing unit 5. The rotating shaft 2 rotates around an axis A as a center line. The reflection-type encoder 1 is, for example, an absolute type rotary encoder and is a device for detecting an absolute angle of an object to be measured connected to the rotating shaft 2.

The rotary plate 3 is fixed to the rotating shaft 2 and rotates with the rotating shaft 2. The rotary plate 3 is a so-called code wheel. The rotary plate 3 is formed in a disk shape, and is attached to the rotating shaft 2 at a center part so as to be disposed perpendicular to the axis A. The rotary plate 3 has a main surface 3*a* facing the optical module 4. On the main surface 3*a*, a light reflection pattern 3*b* that reflects light emitted from the optical module 4 is formed. The light reflection pattern 3*b* represents a predetermined pattern such as a gray code. The light reflection pattern 3*b* is a light reflecting film formed of a metal such as Cr. A portion of the rotary plate 3 where the light reflection pattern 3*b* is not formed is configured to reduce reflection of light.

The optical module 4 is an optical module for an encoder to be applied to the reflection-type encoder 1, and is fixed so as to face a part of the main surface 3*a* of the rotary plate 3. That is, the optical module 4 faces a part of the light reflection pattern 3*b*. The optical module 4 has a light receiving element 12 and a light emitting element 13 described later. The processing unit 5 is, for example, a signal processing circuit, encodes the light detection result in the light receiving element 12 of the optical module 4, and outputs a gray code representing an absolute value of a rotation angle of the rotating shaft 2.

In the reflection-type encoder 1, when the light reflection pattern 3*b* is positioned on an optical axis of light emitted from the light emitting element 13 of the optical module 4, the light is reflected by the light reflection pattern 3*b*, and the reflected light is incident on the light receiving element 12 of the optical module 4. On the other, when the light reflection pattern 3*b* is not positioned on the optical axis of the light emitted from the light emitting element 13, the light from the light emitting element 13 passes through the rotary plate 3 and is not incident on the light receiving element 12.

[Configuration of Optical Module]

Figure 2:
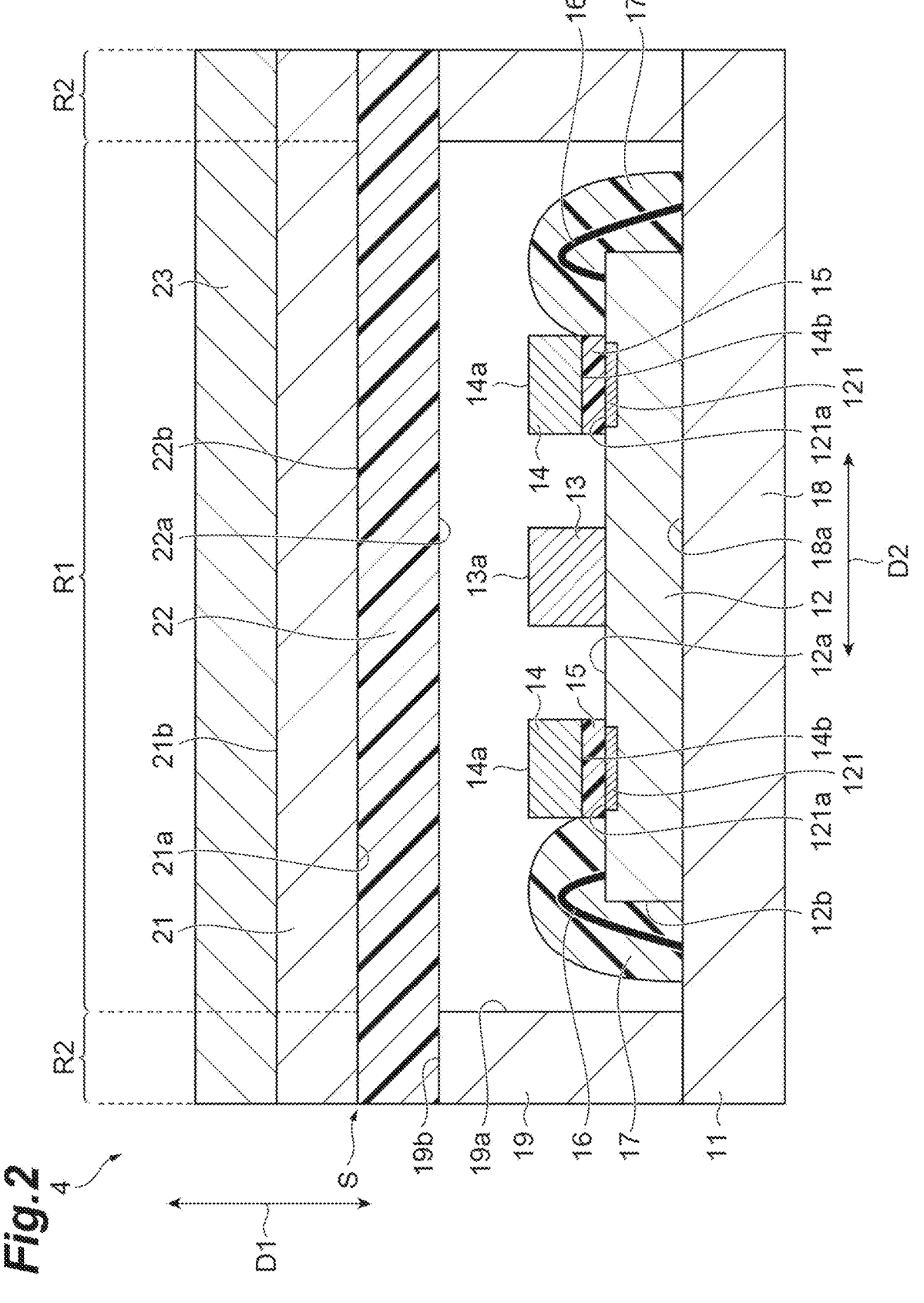
FIG. 2 is a cross-sectional view of an optical module illustrated in FIG. 1.

As illustrated in FIG. 2, the optical module 4 includes a support 11, the light receiving element 12, the light emitting element 13, a fiber optical plate 14, an adhesive film 15, a wire 16, a resin member 17, a light transmitting member 21, a resin member 22, and an anti-reflective layer 23.

The support 11 has a bottom wall part 18 which is a substrate member, and a side wall part 19 disposed on the bottom wall part 18. The bottom wall part 18 has a rectangular plate shape and has a flat surface 18a. The bottom wall part 18 may be formed of, for example, a glass epoxy resin. The bottom wall part 18 has wiring (not illustrated) to which the wire 16 is connected. Hereinafter, a thickness direction of the bottom wall part 18 (a direction perpendicular to the surface 18a) is defined as a direction D1, and a direction perpendicular to the direction D1 is defined as a direction D2.

The side wall part 19 surrounds a region on the bottom wall part 18 when viewed from the thickness direction of the bottom wall part 18. The side wall part 19 is provided along the outer edge of the surface 18a, and has a rectangular frame shape when viewed from the direction D1. The side wall part 19 may be formed of the same material as the bottom wall part 18, for example, a glass epoxy resin. The side wall part 19 has an inner surface 19a and an end surface 19b positioned on a side opposite to the bottom wall part 18.

The light receiving element 12 is a rectangular plate-shaped light receiving chip, and detects light reflected by the light reflection pattern 3b. The light receiving element 12 has a light receiving part 121. The light receiving part 121 is, for example, a photodiode or a photodiode array, and has a light receiving surface 121a on an upper surface 12a side of the light receiving element 12. The light receiving surface 121a constitutes a part of the upper surface 12a. The light receiving element 12 is disposed on the surface 18a so as to be surrounded by the side wall part 19 and such that the light receiving surface 121a faces a side opposite to the bottom wall part 18. For example, the light receiving element 12 converts light incident on the light receiving surface 121a into an electric signal, and outputs the converted electric signal to the processing unit 5. The light receiving element 12 has wiring (not illustrated) to which the wire 16 for outputting an electric signal is connected.

The light emitting element 13 is a light source that emits light toward the rotary plate 3, and is, for example, an LED (Light Emitting Diode). The light emitting element 13 has a light emitting surface 13a from which light is emitted. The light emitting element 13 is disposed on the upper surface 12a of the light receiving element 12 so as to be surrounded by the side wall part 19 and such that the light emitting surface 13a faces a side opposite to the bottom wall part 18. In the present embodiment, the light emitting element 13 is disposed at a central portion of the upper surface 12a. In this example, the light emitting element 13 is disposed between two light receiving elements 12 arranged in the direction D2. The light emitting element 13 emits, for example, light having a wavelength of 800 nm or more and 900 nm or less. In this example, the light emitting element 13 emits light having a wavelength of about 850 nm.

The fiber optical plate (also referred to as "FOP" hereinafter) 14 is an optical component formed by bundling a plurality of optical fibers. The FOP 14 includes, for example, tens of millions of optical fibers having a diameter of several nm to several tens of nm. The FOP 14 has a rectangular parallelepiped shape and has an input surface 14a and an output surface 14b. The input surface 14a is constituted by surfaces of one end of a plurality of optical fibers included in the FOP 14, and the output surface 14b is constituted by surfaces of the other end of the plurality of optical fibers. In the present embodiment, the input surface 14a and the output surface 14b are parallel to each other and face opposite sides to each other in the direction D1.

The FOP 14 is disposed on the light receiving element 12 such that the input surface 14a and the output surface 14b are parallel to the light receiving surface 121a of the light receiving element 12 and the output surface 14b faces the light receiving surface 121a. The light incident on the input surface 14a of the FOP 14 propagates in each optical fiber constituting the FOP 14, and is emitted from the output surface 14b toward the light receiving surface 121a. The light incident on the input surface 14a is emitted from the output surface 14b without spreading in the FOP 14.

The adhesive film 15 is disposed between the light receiving surface 121a and the output surface 14b and bonds the FOP 14 to the light receiving element 12. The adhesive film 15 is in contact with the light receiving surface 121a and the output surface 14b. When viewed from the direction D1, an outer edge of the adhesive film 15 overlaps an outer edge of the FOP 14, and the adhesive film 15 does not protrude to the outside of the FOP 14. The adhesive film 15 may be, for example, a die attach film. The die attach film is formed into a film shape, and an object to be bonded can be attached to both surfaces thereof. In this example, one surface of the die attach film is attached to the light receiving surface 121a, and the other surface is attached to the output surface 14b. For example, the die attach film is attached to the object to be bonded by being heated and cured. For example, when a substrate that becomes the FOP 14 at the time of manufacturing the optical module 4 is cut (diced), the die attach film may be used for fixing the substrate. In this case, first, the die attach film is attached to the surface of the substrate. A dicing tape is provided on a surface of the die attach film on a side opposite to the substrate, and the substrate is fixed to a base (for example, a dicing frame) on which the substrate is placed at the time of cutting of the substrate, by the dicing tape. After a cutting step is completed, the dicing tape is peeled off from the die attach film.

The wire 16 is a bonding wire connected to the bottom wall part 18 and the light receiving element 12. One end of the wire 16 is connected to the exposed portion of the wiring of the bottom wall part 18 on the surface 18a, and the other end of the wire 16 is connected to the exposed portion of the wiring of the light receiving element 12 on the upper surface 12a. The wire 16 is curved so as to be convex toward a side opposite to the bottom wall part 18 (a side on which the light receiving element 12 is positioned with respect to the bottom wall part 18).

The resin member 17 is disposed on the surface 18a of the bottom wall part 18 and covers the wire 16. In the present embodiment, the resin member 17 covers the entire wire 16. That is, the wire 16 is not exposed from the resin member 17. The resin member 17 is disposed on both sides of the light receiving element 12 in the direction D2. The resin member 17 is in contact with the surface 18a of the bottom wall part 18, the upper surface 12a and a side surface 12b of the light receiving element 12, an outer edge part of the adhesive film 15, and an outer edge part of the FOP 14. The resin member 17 does not reach the peripheral edge part of the surface 18a and is not in contact with the inner surface 19a of the side wall part 19. The peripheral edge part of the surface 18a is an inner portion of the surface 18a adjacent to the side wall part 19. The peripheral edge part of the surface 18a is exposed from the resin member 17.

The light transmitting member 21 is disposed on the end surface 19b of the side wall part 19 so as to cover a space surrounded by the side wall part 19. The light transmitting member 21 has, for example, a rectangular plate shape and has a surface 21*a* facing the bottom wall part 18 and a surface 21*b* positioned on a side opposite to the bottom wall part 18. The light transmitting member 21 is formed of a material having light transparency such as glass. A thickness of the light transmitting member 21 may be, for example, about 0.3 mm.

The surface 21*a* of the light transmitting member 21 has an inner region R1 facing the light emitting element 13 and an outer region R2 surrounding the inner region R1 and facing the end surface 19*b*. The inner region R1 is positioned inside the inner surface 19*a* of the side wall part 19 when viewed from the direction D1, and has a rectangular shape in the present embodiment. The outer region R2 overlaps the end surface 19*b* when viewed from the direction D1, and has a rectangular frame shape in the present embodiment. The inner region R1 and the outer region R2 are flat regions continuous with each other.

The resin member 22 is formed on the surface 21*a* of the light transmitting member 21. More specifically, the resin member 22 is integrally formed over the inner region R1 and the outer region R2 so as to have a portion facing the light emitting element 13. The resin member 22 overlaps the light emitting surface 13*a* of the light emitting element 13 when viewed from the direction D1. In the present embodiment, the resin member 22 is formed over the entire surface 21*a*. That is, the resin member 22 is formed over the entire inner region R1 and the entire outer region R2. The resin member 22 is formed of a resin material having light transparency (for example, a silicone resin or an acrylic resin). A light transmittance of the resin member 22 with respect to the light emitted from the light emitting element 13 (for example, light having a wavelength of 800 nm or more and 900 nm or less) is, for example, 90% or more. A thickness of the resin member 22 may be, for example, about 30 μm. The resin member 22 may be a thermosetting resin or a thermoplastic resin.

The resin member 22 has a surface 22*a* facing the bottom wall part 18 and a surface 22*b* positioned on a side opposite to the bottom wall part 18. A portion of the surface 22*a* facing the end surface 19*b* of the side wall part 19 is in contact with the end surface 19*b*, and the entire surface 22*b* is in contact with the surface 21*a* of the light transmitting member 21. The light transmitting member 21 is bonded to the side wall part 19 by the resin member 22, more specifically, by a portion of the resin member 22 formed on the outer region R2. The resin member 22 is constituted by, for example, an adhesive film that is a die attach film. Similarly to the die attach film constituting the adhesive film 15, for example, when a substrate that becomes the light transmitting member 21 at the time of manufacturing the optical module 4 is cut (diced), the die attach film may be used for fixing the substrate to a base. In this case, first, the die attach film is attached to the surface of the substrate. A dicing tape is provided on a surface of the die attach film on a side opposite to the substrate, and the substrate is fixed to a base on which the substrate is placed at the time of cutting of the substrate, by the dicing tape. After a cutting step is completed, the dicing tape is peeled off from the die attach film.

The light emitted from the light emitting element 13 is incident on the resin member 22 from the surface 22*a* side, passes through an interface S between the resin member 22 and the light transmitting member 21 (the surface 22*b* and the surface 21*a*), and is incident on the light transmitting member 21. A refractive index of the resin member 22 with respect to light having a center wavelength of light emitted from the light emitting element 13 is smaller than a refractive index of the light transmitting member 21 with respect to the light having the center wavelength. That is, the light from the light emitting element 13 is incident on a member having a large refractive index (light transmitting member 21) from a member having a small refractive index (resin member 22) at the interface S. Therefore, the resin member 22 functions as an anti-reflective layer with respect to light incident on the light transmitting member 21 from the light emitting element 13 side.

The anti-reflective layer 23 is formed into a film shape on the surface 21*b* of the light transmitting member 21, and prevents reflection of light on the surface 21*b*. The anti-reflective layer 23 is formed over the entire surface 21*b*. A thickness of the anti-reflective layer 23 may be, for example, about 3 μm.

Figure 3:
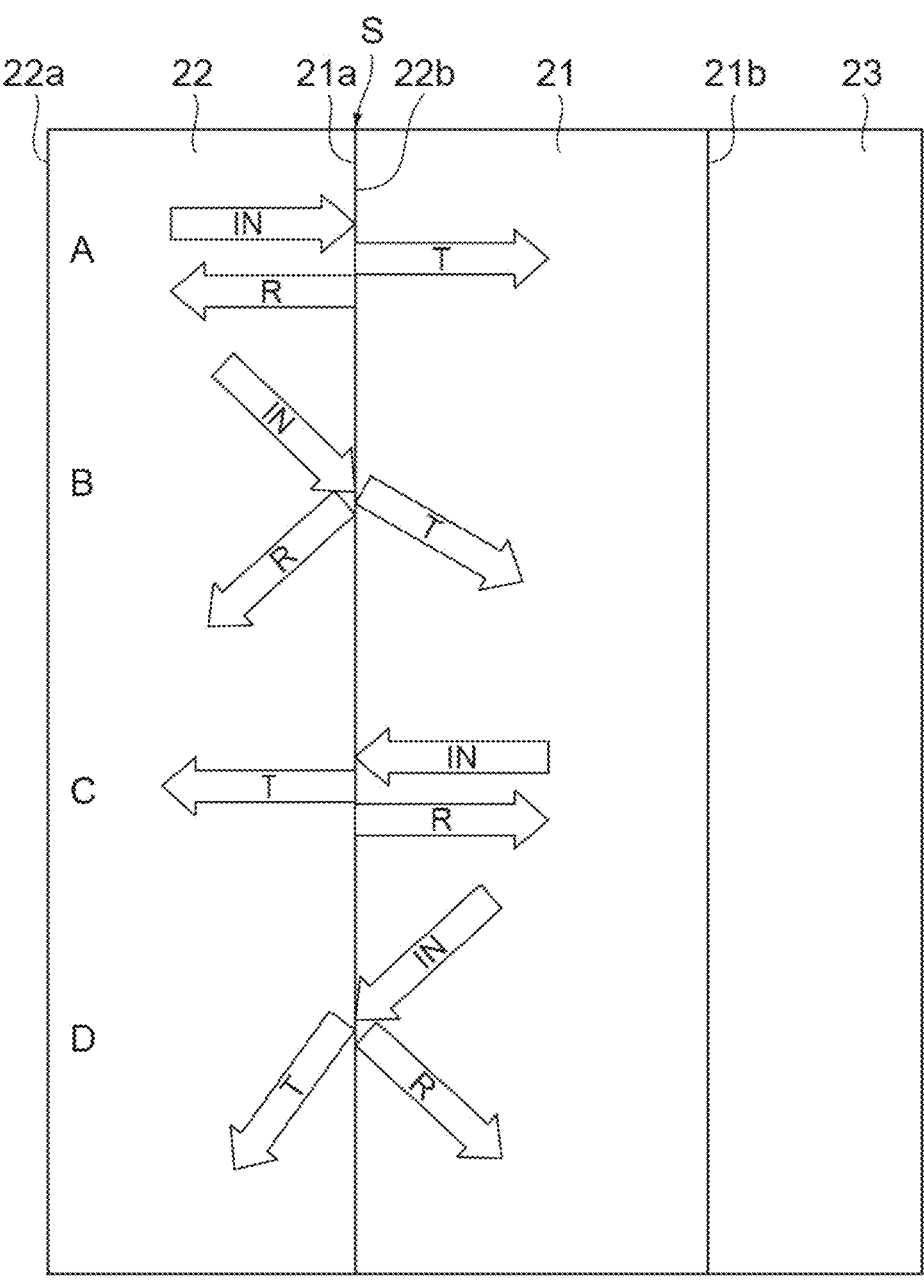
FIG. 3 is a view illustrating how light travels in a simulation regarding a reflectance.

The reflectance of light at the interface S between the resin member 22 and the light transmitting member 21 will be described with reference to FIG. 3 and FIG. 4. Simulation was performed on the reflectance when light was incident on the interface S while changing conditions (incident direction and incident angle of the light). In FIG. 3, "IN" is written in an arrow indicating incident light under each condition, "R" is written in an arrow indicating reflected light, and "T" is written in an arrow indicating transmitted light.

As illustrated in FIG. 3, under the condition A, the light was made incident on the interface S at an incident angle of 0° from the resin member 22 side, and under the condition B, the light was made incident on the interface S at an incident angle of 45° from the resin member 22 side. The condition B corresponds to a case where light spread from the light emitting element 13 to the resin member 22 is incident on the interface S. Under the condition C, the light was made incident on the interface S at an incident angle of 0° from the light transmitting member 21 side, and under the condition D, the light was made incident on the interface S at an incident angle of 45° from the light transmitting member 21 side. The condition D corresponds to a case where light reflected by the light reflection pattern 3*b* of the rotary plate 3 and spread before reaching the light transmitting member 21 is incident on the interface S. In this simulation, the refractive index of the light transmitting member 21 was set to 1.50, and the refractive index of the resin member 22 was set to 1.40.

Figure 4:
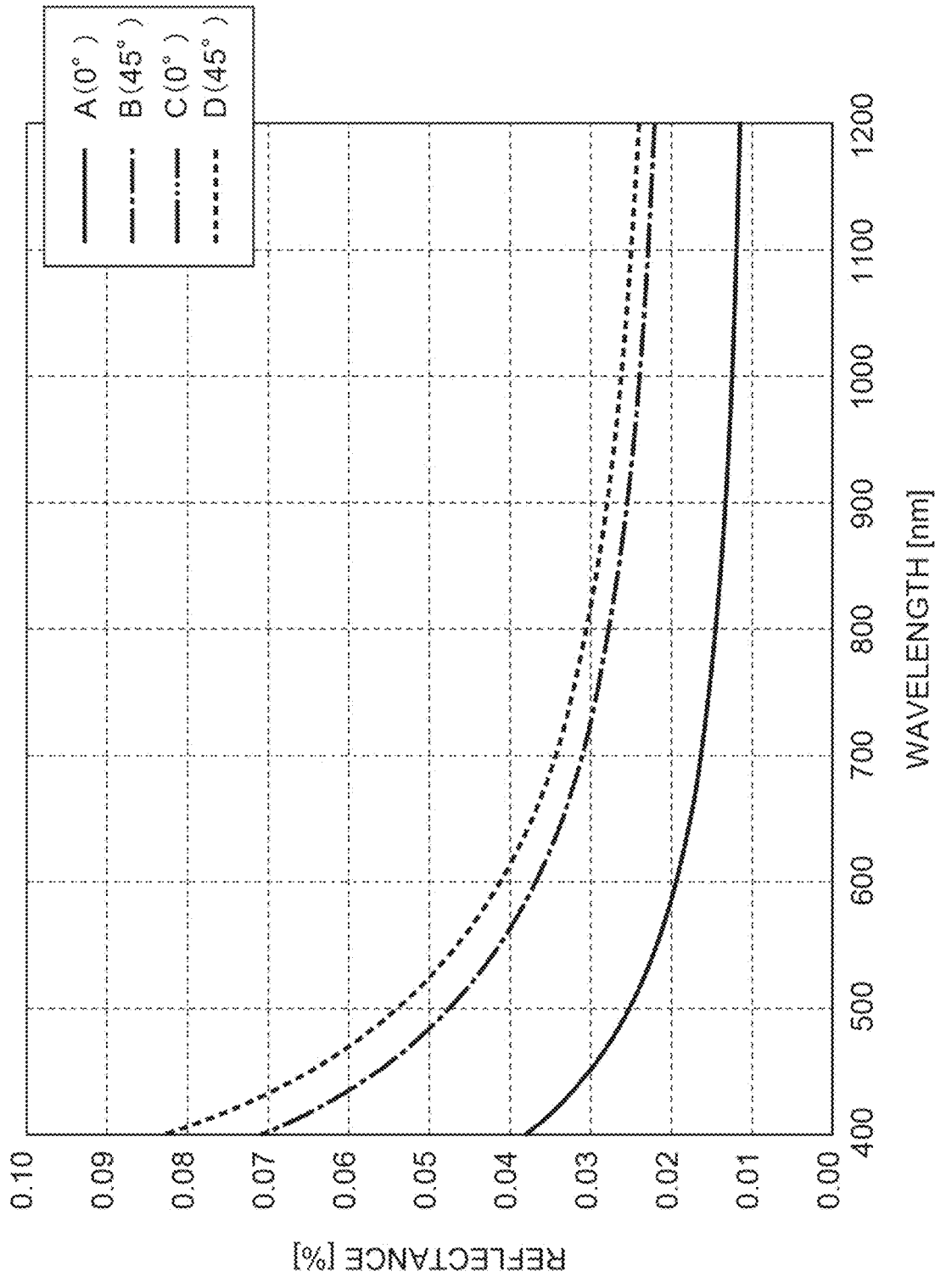
FIG. 4 is a graph showing the result of the simulation regarding a reflectance.

FIG. 4 shows a simulation result of the reflectance in a case where the wavelength of the incident light is changed in a range of 400 nm to 1200 nm under each condition. Since the results under the condition A and the condition C coincide with each other, the results are shown by one overlapping solid line in FIG. 4. As shown in FIG. 4, for example, in a wavelength band of 800 nm or more and 900 nm or less, the reflectance under the conditions A and C was about 0.015%, the reflectance under the condition B was about 0.025%, and the reflectance under the condition D was about 0.030%.

Furthermore, the reflectance under the condition B was smaller than the reflectance under the condition D at any wavelength for which the simulation was performed. From this simulation result, it is found that, in the optical module 4, a reflectance (also referred to as reflectance X1 hereinafter) at the interface S when the light having the center wavelength of the light emitted from the light emitting element 13 is incident on the interface S from the resin member 22 side at an incident angle of 45 degrees is smaller than a reflectance (also referred to as reflectance X2) at the interface S when the light having the center wavelength is incident on the interface S from the light transmitting member 21 side at an incident angle of 45 degrees. In other words, the optical module 4 is configured such that the reflectance X1 is smaller than the reflectance X2.

[Functions and Effects]

As described above, in the optical module 4, the resin member 22 is formed on the surface 21a of the light transmitting member 21 facing the bottom wall part 18, and the resin member 22 is integrally formed over the inner region R1 and the outer region R2 on the surface 21a so as to have a portion facing the light emitting element 13. Further, the refractive index of the resin member 22 with respect to light having a center wavelength of light emitted from the light emitting element 13 is smaller than the refractive index of the light transmitting member 21 with respect to the light having the center wavelength. Thereby, the resin member 22 can function as an anti-reflective layer, and the light from the light emitting element 13 can be suppressed from being reflected by the light transmitting member 21. As a result, light reflected by the surface 21a can be suppressed from being incident on the light receiving element 12 as noise light, and the detection accuracy can be improved. Furthermore, since the resin member 22 is present, reflection of light reflected by the light reflection pattern 3b and returning to the optical module 4 on the surface 21a is also suppressed. As a result, the amount of light incident on the light receiving element 12 can be increased, and the detection accuracy can be improved. The light transmitting member 21 is bonded to the side wall part 19 by a portion of the resin member 22 formed on the outer region R2. Thereby, it is not necessary to provide a member for bonding (for example, a resin adhesive) between the light transmitting member 21 and the side wall part 19 separately from the resin member 22 functioning as an anti-reflective layer, and the configuration can be simplified. Further, in the case of applying the optical module 4 to the reflection-type encoder 1, for example, as compared with a case where the light transmitting member 21 is disposed on the side wall part 19 with the anti-reflective layer and the member for bonding interposed therebetween, a distance from the light receiving element 12 and the light emitting element 13 to the rotary plate 3 can be shortened. When the distance from the light receiving element 12 and the light emitting element 13 to the rotary plate 3 is short, spreading of light among the light receiving element 12, the light emitting element 13, and the rotary plate 3 can be suppressed. As a result, the amount of light received by the light receiving element 12 can be increased, and the detection accuracy can be improved. Furthermore, in a case where the member for bonding is a resin adhesive having no light transparency, the resin adhesive protrudes to the inside of the side wall part 19, and the surface 21a of the light transmitting member 21 is blocked by the protruding resin adhesive, so that the light transmission area may be reduced. On the other hand, since it is not necessary to provide a member for bonding in the optical module 4, such a reduction in light transmission area can be suppressed, and the detection accuracy can be improved. Therefore, according to optical module 4, the configuration can be simplified, and the detection accuracy can be improved.

The resin member 22 is formed over the entire inner region R1. Thereby, the light emitted from the light emitting element 13 and spread can be more reliably suppressed from being reflected on the surface 21a of the light transmitting member 21, and the detection accuracy can be further improved.

The reflectance X1 at the interface S between the light transmitting member 21 and the resin member 22 when the light having the center wavelength of light emitted from the light emitting element 13 is incident on the interface S from the resin member 22 side at an incident angle of 45 degrees is smaller than the reflectance X2 at the interface S when the light having the center wavelength is incident on the interface S from the light transmitting member 21 side at an incident angle of 45 degrees. Thereby, the light emitted from the light emitting element 13 and incident on the interface S at an angle other than perpendicular can be more reliably suppressed from being reflected at the interface S. That is, by making the reflectance X1 smaller than the reflectance X2, the incidence of noise light (light reflected by the surface 21a of the light in the direction exiting from the optical module 4) on the light receiving element 12 is suppressed. As a result, the detection accuracy can be further improved.

The light transmittance of the resin member 22 with respect to light having a wavelength of 800 nm or more and 900 nm or less is 90% or more. Thereby, when the light emitting element 13 that emits the light having this wavelength is used, the resin member 22 can be favorably transmitted through the light emitted from the light emitting element 13. As a result, the detection accuracy can be further improved.

The resin member 22 is an adhesive film (die attach film). Thereby, since the heated resin member 22 is cured in a relatively short time, the light transmitting member 21 can be accurately bonded to the end surface 19b of the side wall part 19 by the resin member 22. That is, for example, in a case where the resin member 22 is not an adhesive film but is a resin member requiring time for curing after heating, the position of the light transmitting member 21 may be shifted until the resin material is cured. On the other hand, in a case where the resin member 22 is an adhesive film, the heated resin member 22 is cured in a relatively short time, so that such positional displacement of the light transmitting member 21 can be suppressed, and the light transmitting member 21 can be accurately bonded to the side wall part 19 by the resin member 22. As a result, the yield of the optical module 4 can be improved.

The light emitting element 13 is disposed on the light receiving element 12. Thereby, in a case where the optical module 4 is applied to the reflection-type encoder 1, a distance between the light emitting element 13 and the rotary plate 3 can be shortened, and the detection accuracy can be further improved.

The optical module 4 further includes the FOP 14 having the input surface 14a constituted by surfaces of one end of a plurality of optical fibers and the output surface 14b constituted by surfaces of the other end of the plurality of optical fibers, the light receiving element 12 has the light receiving surface 121a facing a side opposite to the bottom wall part 18, and the FOP 14 is disposed on the light receiving element 12 such that the output surface 14b faces the light receiving surface 121a. Thereby, the light incident on the input surface 14a can be reliably guided to the light receiving surface 121a, and the detection accuracy can be further improved.

The optical module 4 includes the adhesive film 15 disposed between the light receiving surface 121a and the output surface 14b and bonding the FOP 14 to the light receiving element 12. Thereby, since the heated adhesive film 15 is cured in a relatively short time, the FOP 14 can be accurately bonded to the light receiving element 12 by the adhesive film 15. That is, for example, in a case where a member bonding the FOP 14 to the light receiving element 12 is not an adhesive film 15 but is a resin member requiring time for curing after heating, the position of the FOP 14 material be shifted until the resin material is cured. On the other hand, in a case where a member bonding the FOP 14 to the light receiving element 12 is the adhesive film 15, the heated adhesive film 15 is cured in a relatively short time, so that such positional displacement of the FOP 14 can be suppressed, and the FOP 14 can be accurately bonded to the light receiving element 12 by the adhesive film 15. As a result, the yield of the optical module 4 can be improved.

The anti-reflective layer 23 is formed on the surface 21*b* of the light transmitting member 21 on a side opposite to the bottom wall part 18. Thereby, reflection of light on the surface 21*b* can be suppressed, and the amount of light received by the light receiving element 12 can be increased. As a result, the detection accuracy can be further improved.

The optical module 4 includes the wire 16 connected to the bottom wall part 18 and the light receiving element 12 and the resin member 17 covering the wire 16. Thereby, the wire 16 can be protected from oil scattered when the reflection-type encoder 1 is used, physical external force, and the like.

[Modifications]

Figure 5:
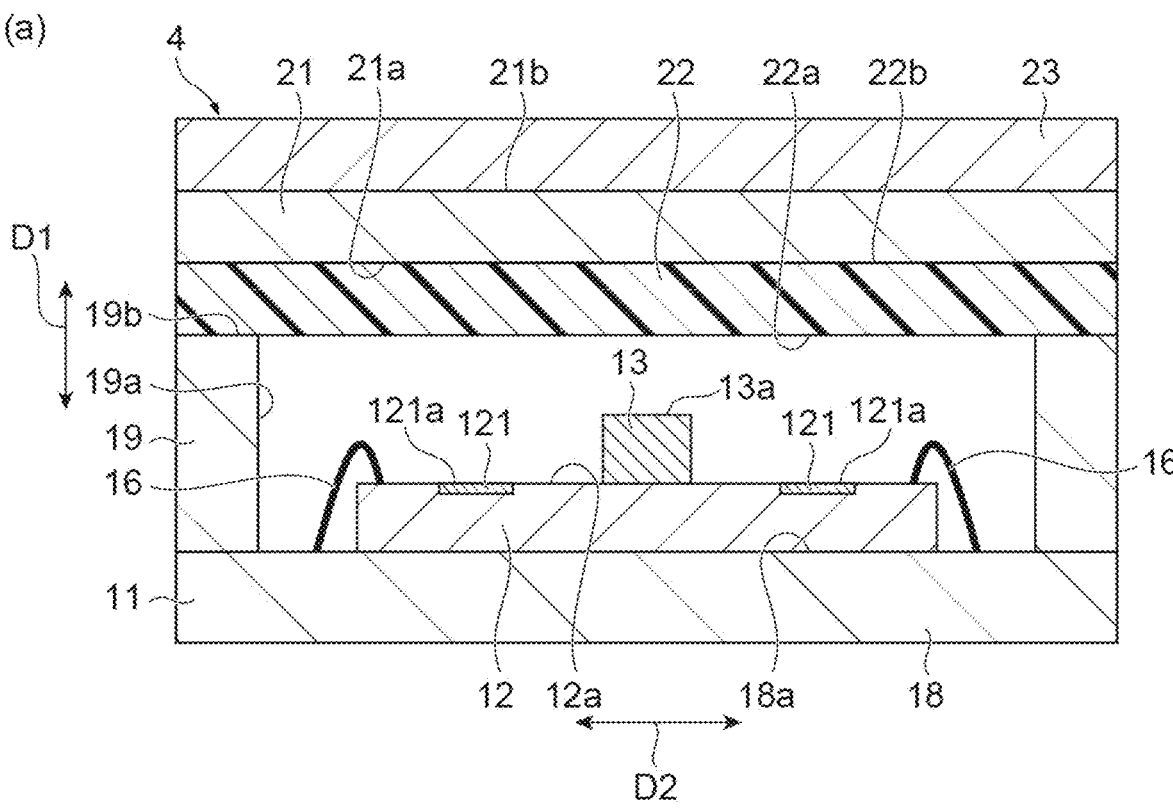
FIGS. 5(*a*) and 5(*b*) are cross-sectional views of an optical module according to a modification.
Figure 5:
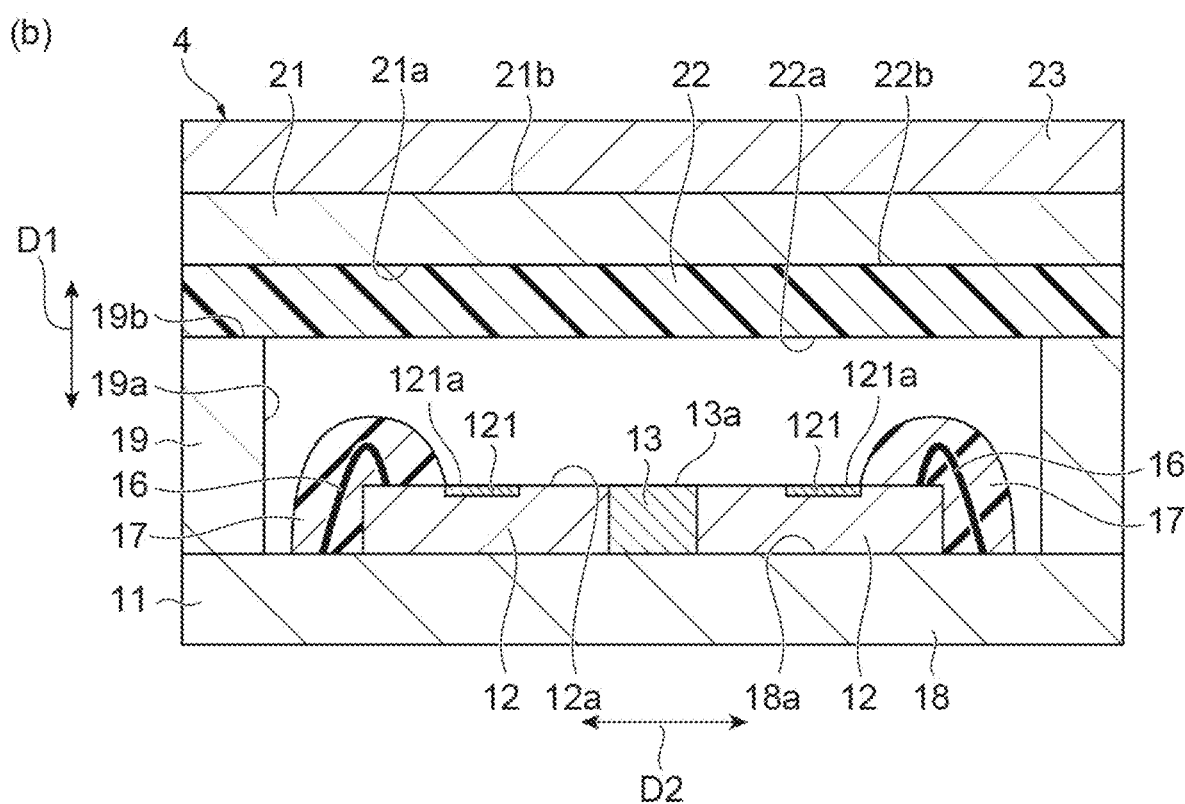

The optical module 4 may be configured as in a first modification illustrated in FIG. 5(*a*), or may be configured as in a second modification illustrated in FIG. 5(*b*). In the first modification, the optical module 4 does not include the FOP 14, the adhesive film 15, and the resin member 17. Therefore, the light receiving surface 121*a* is exposed at the upper surface 12*a* of the light receiving element 12, and the light transmitted through the resin member 22 is directly incident on the light receiving surface 121*a*. Furthermore, the wire 16 is exposed without being covered with the resin member 17.

According to such a first modification as well, similarly to the above embodiment, the configuration can be simplified, and the detection accuracy can be improved. Furthermore, in the first modification, since the optical module 4 does not include the FOP 14, the adhesive film 15, and the resin member 17, the configuration of the optical module 4 can be further simplified.

In the second modification illustrated in FIG. 5(*b*), the optical module 4 does not include the FOP 14 and the adhesive film 15. Therefore, the light receiving surface 121*a* is exposed at the upper surface 12*a* of the light receiving element 12, and the light transmitted through the resin member 22 is directly incident on the light receiving surface 121*a*. Furthermore, in this modification, the optical module 4 includes a pair of light receiving elements 12 disposed side by side in the direction D2. The light emitting element 13 is disposed between the pair of light receiving elements 12. The position of the light emitting surface 13*a* in the direction D1 coincides with the position of the light receiving surface 121*a*.

According to such a second modification as well, similarly to the above embodiment, the configuration can be simplified, and the detection accuracy can be improved. Furthermore, in the second modification, since the optical module 4 does not include the FOP 14 and the adhesive film 15, the configuration of the optical module 4 can be further simplified.

The present disclosure is not limited to the above embodiment and modifications. For example, the material and shape of each configuration are not limited to the material and shape described above, and various materials and shapes can be adopted. For example, the resin member 22 only has to be formed in a part of the inner region R1 so as to have a portion facing the light emitting element 13, or does not have to be formed over the entire inner region R1. The resin member 22 only has to be formed in a part of the outer region R2 to such an extent that the light transmitting member 21 can be bonded to the side wall part 19, or does not have to be formed over the entire outer region R2. The resin member 22 may be formed by curing the resin material melted by heating. The light transmittance of the resin member 22 with respect to light having a wavelength of 800 nm or more and 900 nm or less may be smaller than 90%.

The resin member 17 may not cover the entire wire 16, or may cover only a part of the wire 16. The anti-reflective layer 23 may be formed on a part of the surface 21*b* of the light transmitting member 21, or may be omitted.

The features of the above embodiments and modifications may be combined with each other. For example, in the first modification illustrated in FIG. 5(*a*), the optical module 4 may include the FOP 14 and the adhesive film 15. In the first modification, the optical module 4 may include the resin member 17. For example, in the second modification illustrated in FIG. 5(*b*), the optical module 4 may include the FOP 14 and the adhesive film 15. In the second modification, the optical module 4 may not include the resin member 17.

The number of light receiving parts 121 (light receiving surfaces 121*a*) included in the light receiving element 12 is not limited, and may be one or more. The light receiving element 12 may be connected to the wiring of the bottom wall part 18 via a bump instead of the wire 16.

REFERENCE SIGNS LIST

1 reflection-type encoder
3 rotary plate
3*b* light reflection pattern
4 optical module (optical module for encoder)
11 support
12 light receiving element
13 light emitting element
14 FOP (fiber optical plate)
14*a* input surface
14*b* output surface
15 adhesive film
16 wire
17 resin member
18 bottom wall part
18*a* surface
19 side wall part
19*b* end surface
21 light transmitting member
21*a*, 21*b* surface
22 resin member
23 anti-reflective layer
121*a* light receiving surface
D1, D2 direction
R1 inner region
R2 outer region
S interface

The invention claimed is:

1. An optical module for an encoder to be applied to a reflection-type encoder, the optical module comprising:

a support including a bottom wall part and a side wall part surrounding a region on the bottom wall part when viewed from a thickness direction of the bottom wall part;

a light receiving element and a light emitting element disposed on the bottom wall part so as to be surrounded by the side wall part;

a light transmitting member disposed on an end surface of the side wall part on a side opposite to the bottom wall part so as to cover a space surrounded by the side wall part and including a surface facing the bottom wall part; and a resin member formed on the surface of the light transmitting member, wherein the surface of the light transmitting member includes an inner region facing the light emitting element and an outer region surrounding the inner region and facing the end surface, the resin member is integrally formed over the inner region and the outer region so as to include a portion facing the light emitting element, a refractive index of the resin member with respect to light having a center wavelength of light emitted from the light emitting element is smaller than a refractive index of the light transmitting member with respect to the light having the center wavelength, and the light transmitting member is bonded to the side wall part by a portion of the resin member formed on the outer region.

2. The optical module for an encoder according to claim 1, wherein the resin member is formed over the entire inner region.

3. The optical module for an encoder according to claim 1, wherein a reflectance at an interface between the light transmitting member and the resin member when the light having the center wavelength is incident on the interface from the resin member side at an incident angle of 45 degrees is smaller than a reflectance at the interface when the light having the center wavelength is incident on the interface from the light transmitting member side at an incident angle of 45 degrees.

4. The optical module for an encoder according to claim 1, wherein a light transmittance of the resin member with respect to light having a wavelength of 800 nm or more and 900 nm or less is 90% or more.

5. The optical module for an encoder according to claim 1, wherein the resin member is an adhesive film.

6. The optical module for an encoder according to claim 1, wherein the resin member is a die attach film.

7. The optical module for an encoder according to claim 1, wherein the light emitting element is disposed on the light receiving element.

8. The optical module for an encoder according to claim 1, further comprising a fiber optical plate including an input surface constituted by surfaces of one end of a plurality of optical fibers and an output surface constituted by surfaces of the other end of the plurality of optical fibers, wherein the light receiving element includes a light receiving surface facing a side opposite to the bottom wall part, and the fiber optical plate is disposed on the light receiving element with the output surface facing the light receiving surface.

9. The optical module for an encoder according to claim 8, further comprising an adhesive film disposed between the light receiving surface and the output surface and configured to bond the fiber optical plate to the light receiving element.

10. The optical module for an encoder according to claim 1, wherein an anti-reflective layer is formed on a surface of the light transmitting member on a side opposite to the bottom wall part.

11. The optical module for an encoder according to claim 1, further comprising:

a wire connected to the bottom wall part and the light receiving element; and a resin member covering the wire.

12. A reflection-type encoder comprising:

a rotary plate including a light reflection pattern; and the optical module for an encoder according to claim 1.

* * * * *